United States Patent
Choi

(10) Patent No.: US 10,143,922 B2
(45) Date of Patent: Dec. 4, 2018

(54) SERVER APPARATUS, CONTROL METHOD FOR SERVER APPARATUS, AND PROGRAM

(71) Applicant: GREE, Inc., Tokyo (JP)

(72) Inventor: Seokhoon Choi, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 15/878,553

(22) Filed: Jan. 24, 2018

(65) Prior Publication Data

US 2018/0147490 A1     May 31, 2018

Related U.S. Application Data

(63) Continuation of application No. 14/976,609, filed on Dec. 21, 2015, now Pat. No. 9,919,212.

(30) Foreign Application Priority Data

Dec. 22, 2014   (JP) ................................. 2014-259236
Aug. 17, 2015   (JP) ................................. 2015-160671

(51) Int. Cl.
*A63F 9/24*        (2006.01)
*A63F 13/49*      (2014.01)
(Continued)

(52) U.S. Cl.
CPC .............. *A63F 13/49* (2014.09); *A63F 13/30* (2014.09); *A63F 13/35* (2014.09); *A63F 13/77* (2014.09); *H04L 67/10* (2013.01)

(58) Field of Classification Search
None
See application file for complete search history.

(56) References Cited

U.S. PATENT DOCUMENTS 5,411,271 A * 5/1995 Mirando ................. A63F 13/10
                                               273/153 R
5,696,898 A * 12/1997 Baker ................... G06F 21/604
                                               707/999.009

(Continued)

FOREIGN PATENT DOCUMENTS

JP     2013-247977 A    11/2013
JP     2014-087701 A     5/2014
(Continued)

OTHER PUBLICATIONS

Japanese Office Action dated Mar. 17, 2015 in corresponding Japanese Application No. 2014-259236; 9 pgs.
(Continued)

*Primary Examiner* — Paul A D'Agostino
(74) *Attorney, Agent, or Firm* — Maier & Maier, PLLC

(57) ABSTRACT

A server apparatus for providing a game using game media to a user over a network may include a storage unit, an identifier obtaining unit, and a game content output unit. The storage unit may store identifiers and game media in association with each other. The identifier obtaining unit may obtain, from a terminal apparatus, an identifier selected through a user operation. The game content output unit may obtain a game content associated with the identifier obtained by the identifier obtaining unit and may output the game content to the terminal apparatus. The game content may not be identifiable using the identifier.

20 Claims, 10 Drawing Sheets

(51) Int. Cl.
*H04L 29/08* (2006.01)
*A63F 13/35* (2014.01)
*A63F 13/30* (2014.01)
*A63F 13/77* (2014.01)

(56) References Cited

U.S. PATENT DOCUMENTS

| | | | |
|---|---|---|---|
| 6,578,054 B1* | 6/2003 | Hopmann | G06F 17/30578 707/625 |
| 2006/0075026 A1* | 4/2006 | Ryu | G06F 17/30879 709/206 |
| 2006/0200668 A1* | 9/2006 | Hybre | G06F 21/53 713/168 |
| 2007/0050196 A1* | 3/2007 | Jadhav | G06Q 99/00 725/139 |
| 2007/0117635 A1 | 5/2007 | Spanton | |
| 2008/0039204 A1 | 2/2008 | Ackley | |
| 2008/0167110 A1* | 7/2008 | Fisk | A63F 3/0605 463/17 |
| 2010/0229123 A1* | 9/2010 | Lloyd | G06Q 30/02 715/826 |
| 2010/0249636 A1* | 9/2010 | Pradeep | A61B 3/113 600/544 |
| 2011/0238192 A1* | 9/2011 | Shah | G10L 19/018 700/94 |
| 2011/0264559 A1* | 10/2011 | Barrientos | G06Q 10/06 705/27.1 |
| 2011/0294558 A1 | 12/2011 | Kim | |
| 2013/0005471 A1* | 1/2013 | Chung | A63F 13/63 463/42 |
| 2013/0053132 A1* | 2/2013 | Schueller | G07F 17/3223 463/25 |
| 2013/0060732 A1* | 3/2013 | Plasek | G06F 17/30348 707/609 |
| 2013/0173765 A1* | 7/2013 | Korbecki | H04N 21/42209 709/221 |
| 2013/0204415 A1* | 8/2013 | Fregley | G06Q 30/02 700/94 |
| 2015/0011302 A1* | 1/2015 | Mayeroff | G07F 17/3225 463/25 |

FOREIGN PATENT DOCUMENTS

| | | |
|---|---|---|
| JP | 2014-132968 A | 7/2014 |
| JP | 2014-195530 A | 10/2014 |

OTHER PUBLICATIONS

Japanese Office Action dated Oct. 27, 2015 in corresponding Japanese Application No. 2015-16067; 7 pgs.
Japanese Office Action dated Feb. 9, 2016 in corresponding Japanese Application No. 2015-16067; 9 pgs.
Japanese Office Action dated Jun. 7, 2016 in corresponding Japanese Application No. 2015-16067; 10 pgs.

* cited by examiner

| IDENTIFIER | ITEM | VALUE | ATTRIBUTE |
|---|---|---|---|
| 001 | IT311 | VA | AT01 |
| 002 | IT579 | VB | AT04 |
| 003 | IT417 | VB | AT02 |
| 004 | IT266 | VC | AT03 |
| 005 | IT808 | VC | AT01 |
| ⋮ | ⋮ | ⋮ | ⋮ |
| 557 | IT777 | VB | AT01 |
| ⋮ | ⋮ | ⋮ | ⋮ |
| 999 | IT999 | VA | AT05 |

| TIME | USER ID | SELECTED IDENTIFIER |
|---|---|---|
| 12/1 08:50 | UID001 | 557 |
| 12/1 10:37 | UID002 | 047 |
| 12/1 11:00 | UID002 | 251 |
| 12/1 11:44 | UID003 | 514 |
| 12/1 12:02 | UID004 | 777 |
| ⋮ | ⋮ | ⋮ |

| TIME | USER ID | PROVIDED HINT |
|---|---|---|
| 12/1 08:50 | UID001 | The number in the ones column of an identifier corresponding to an item having value VA is not 7. |
| 12/1 09:10 | UID001 | The sum of the numbers in the respective columns of an identifier corresponding to an item having value VA is 10. |
| 12/1 11:00 | UID002 | The number in the tens column of an identifier corresponding to an item having value VC is 2. |
| 12/1 11:20 | UID002 | An identifier corresponding to an item having attribute AT02 is between 100 and 150. |
| 12/1 11:44 | UID002 | The number in the ones column of an identifier corresponding to an item having value VB is 5. |
| ⋮ | ⋮ | ⋮ |

SERVER APPARATUS, CONTROL METHOD FOR SERVER APPARATUS, AND PROGRAM

CLAIM OF PRIORITY

This application claims priority from U.S. patent application Ser. No. 14/976,609, filed on Dec. 21, 2015, entitled "SERVER APPARATUS, CONTROL METHOD FOR SERVER APPARATUS, AND PROGRAM," the entire contents of which are hereby incorporated by reference.

FIELD

Exemplary embodiments described herein relate to a server apparatus, a control method for a server apparatus, and a program.

BACKGROUND

Currently, a game system that, in response to an item obtaining request from a communication terminal, randomly selects, by lot, an item other than items that have been provided, and provides the item to the communication terminal is available.

In the game system described above, the user of the communication terminal can only make an item obtaining request, and the game system makes a random selection by lot. Therefore, the user has little room for control and, although the game system runs a fair lottery, some users do not trust the game system, resulting in a decreased satisfaction level. Further, the game system makes a random selection by lot, and therefore, users need to play a lottery multiple times in order to obtain a different result.

SUMMARY

An exemplary embodiment of the present invention is made in view of the above-described situation, and an object thereof is to provide a server apparatus, a control method for a server apparatus, and a program that can increase the degree of trust in the system while maintaining the joy of winning in a lottery as a result of a random selection.

In order to address the above described issue, a server apparatus according to an exemplary embodiment may be a server apparatus for providing a game using game media to a user over a network, the server apparatus including a storage unit, an identifier obtaining unit, and a game content output unit. The storage unit may store identifiers and game media in association with each other. The identifier obtaining unit may obtain, from a terminal apparatus, an identifier selected through a user operation. The game content output unit may obtain a game content associated with the identifier obtained by the identifier obtaining unit and may output the game content to the terminal apparatus. According to an exemplary embodiment, the game content may not be identifiable using the identifier.

According to one exemplary embodiment, the server apparatus may further include a hint providing unit that may provide a hint about an association between an identifier and a game content.

According to an exemplary embodiment of the server apparatus, the hint providing unit may provide a hint in a case where a user of the terminal apparatus clears a predetermined game or a predetermined event in a game.

According to an exemplary embodiment of the server apparatus, the hint providing unit may provide a hint in a case where a user of the terminal apparatus interacts with another user.

According to an exemplary embodiment of the server apparatus, the hint providing unit may provide a hint in accordance with a state of participation of a user of the terminal apparatus in a game or in an event in a game.

According to arm exemplary embodiment of the server apparatus, there may be a plurality of hints, and the hints may include a hint that has been provided.

According to an exemplary embodiment of the server apparatus, the hints may be classifiable according to specific subjects that include at least one of an item, a value, and an attribute.

According to an exemplary embodiment of the server apparatus, the hint may be sharable between users that are associated with each other.

According to an exemplary embodiment of the server apparatus, the hint providing unit may provide the hint only in a case where the game content output by the game content output unit is a specific game content.

According to an exemplary embodiment of the server apparatus, the hint providing unit may provide a hint relating to a subject selected by a user.

According to an exemplary embodiment of the server apparatus, the server apparatus may further include an identifier output unit that may obtain identifiers from the storage unit and may output the identifiers to the terminal apparatus. According to such an embodiment, the identifier obtaining unit may obtain an identifier selected through a user operation from among the identifiers that have been output.

According to an exemplary embodiment of the server apparatus, the identifier output unit may select a certain identifier on the basis of at least either of a hint that has been provided and a game content that has been output, and may output the identifier, which may be input to an input field.

According to an exemplary embodiment of the server apparatus, the identifier output unit may output identifiers that have not been obtained by the identifier obtaining unit.

According to an exemplary embodiment, the server apparatus may further include a reset unit that may reset associations between the identifiers and the game media and which may provide, after resetting, the same number of hints as hints provided before resetting.

According to an exemplary embodiment of the server apparatus, in a case where the identifier obtaining unit receives an output request for outputting a certain number of game media together with the identifier selected through a user operation, the game content output unit may output game media that are associated with the certain number of identifiers; this may include the selected identifier and an additional game content.

According to an exemplary embodiment of the server apparatus, the identifier may be expressed by any of a numeric character, a kanji character, an alphabetic character, a hiragana character, a katakana character, and a symbol, or a combination thereof.

According to an exemplary embodiment, a control method may be associated with the server apparatus; this control method may be a control method for a server apparatus for providing a game using game media to a user over a network. Such a control method may include: a storing step of storing, in a storage unit, identifiers and game media in association with each other; an obtaining step of causing an identifier obtaining unit to obtain, from a terminal apparatus, an identifier selected through a user operation; and an output step of causing a game content output unit to obtain a game content associated with the identifier obtained in the obtaining step and to output the game content to the terminal apparatus. According to one exemplary embodiment, the game content may not be identifiable using the identifier.

According to an exemplary embodiment, a computer program associated with the server apparatus may also be provided. This may be a program for causing a computer that provides a game using game media to a user over a network to perform steps including: a storing step of storing, in a storage unit, identifiers and game media in association with each other; an obtaining step of obtaining, from a terminal apparatus, an identifier selected through a user operation; and an output step of obtaining a game content associated with the identifier obtained in the obtaining step and outputting the game content to the terminal apparatus. According to one exemplary embodiment, the game content may not be identifiable using the identifier.

According to such exemplary embodiments, the server apparatus, the control method for a server apparatus, and the program according to the present invention may be able to increase the degree of trust in the system while maintaining the joy of winning in a lottery as a result of a random selection.

BRIEF DESCRIPTION OF THE DRAWINGS

Exemplary

Exemplary FIG. 2 is a diagram illustrating an example of a game content database (DB) that may be stored in a storage unit of the terminal apparatus illustrated in FIG. 1.

Exemplary

Exemplary FIG. 4 is a diagram illustrating an example of a lottery history DB that may be stored in the storage unit of the terminal apparatus illustrated in FIG. 1.

Exemplary

Exemplary FIG. 6 is a diagram illustrating an example of a provided-hint DB that may be stored in the storage unit of the terminal apparatus illustrated in FIG. 1.

Exemplary

Exemplary

Exemplary

Exemplary

DETAILED DESCRIPTION

Hereinafter, a control method according to one exemplary embodiment will be described with reference to the drawings.

Figure 1:
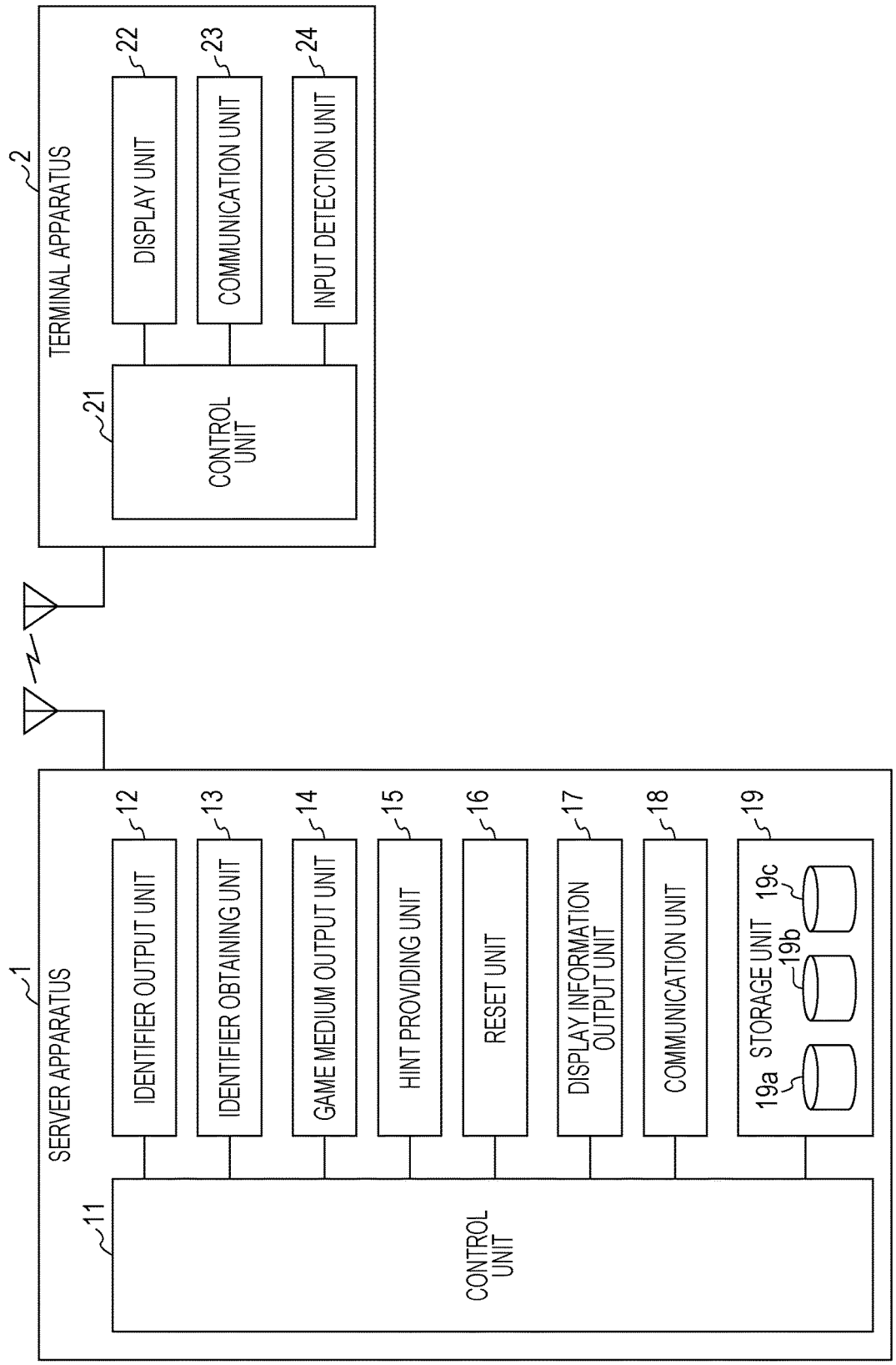
FIG. 1 is a functional block diagram of a server apparatus and a terminal apparatus according to one embodiment of the present invention.

Exemplary FIG. 1 is a functional block diagram of a game system according to one particular exemplary embodiment. The game system may include a server apparatus 1 and a terminal apparatus 2, and the server apparatus 1 and the terminal apparatus 2 may communicate with each other over a network. According to an exemplary embodiment, the number of server apparatuses 1 and the number of terminal apparatuses 2 may not be limited to specific numbers; for example, each may comprise one or multiple devices. The terminal apparatus 2 may be, for example, a portable terminal or a desktop terminal, as desired.

The server apparatus 1 may include a control unit 11, an identifier output unit 12, an identifier obtaining unit 13, a game content output unit 14, a hint providing unit 15, a reset unit 16, a display information output unit 17, a communication unit 18, and a storage unit 19. The server apparatus 1 may provide a game using game media to users over a network. Note that, although a description is given of functions of the server apparatus 1 according to one exemplary embodiment, the description is not intended to exclude other functions that are included in the server apparatus 1.

The control unit 11 may be a processor, such as a central processing unit (CPU), which controls various operations of the server apparatus 1.

The identifier output unit 12 can obtain identifiers from the storage unit 19 described below and may output the identifiers to the terminal apparatus 2.

The identifier obtaining unit 13 may obtain an identifier selected through a user operation. According to an exemplary embodiment, although the identifier may be associated with the game content, the game content may not be identifiable using the identifier. That is, it may not be possible to identify a game content using an identifier.

The game content output unit 14 may refer to the storage unit 19, may search for and obtain a game content that is, in the storage unit 19, associated with an identifier obtained by the identifier obtaining unit 13, and may output the game content to the terminal apparatus 2 as an incentive.

The hint providing unit 15 may provide a hint about an association between an identifier and a game content. For example, the hint providing unit 15 may provide a hint indicating which identifier is associated with which game content.

The reset unit 16 may reset associations between identifiers and game media in response to a user request or at a predetermined time point. The reset unit 16 may perform resetting only in a case where a certain condition is satisfied; for example, the reset unit 16 may perform resetting only when a lottery is played at least once.

The display information output unit 17 may generate information to be displayed by a display unit 22 of the terminal apparatus 2 and may output the information to the terminal apparatus 2. For example, the display information output unit 17 may generate display information that indicates the number of identifiers corresponding to game media having values equal to or larger than a predetermined value among identifiers that are allowed to be input, and may output the information to the terminal apparatus 2.

The communication unit 18 may be an interface for transmitting and/or receiving information to and/or from the terminal apparatus 2. The communication unit 18 may perform communication by at least either wired connection or wireless connection.

The storage unit 19 may be a memory, for example a semiconductor memory, a magnetic memory, or the like, and may store, for example, various DBs, a program for operating the server apparatus 1, and the like. Storage unit 19 may also function as a work memory. The storage unit 19 may store identifiers and game media in association with each other. The storage unit 19 may also include a game content DB 19*a*, a lottery history DB 19*b*, and a provided-hint DB 19*c*. For each user (each terminal apparatus 2), one game content DB 19*a* may be provided. The DBs included in the storage unit 19 may be stored outside the server apparatus 1 and accessed from the server apparatus 1 as needed. According to an exemplary embodiment, the identifier output unit 12, the identifier obtaining unit 13, the game content output unit 14, the hint providing unit 15, and the reset unit 16 may all be implemented as one function of a software program stored in the storage unit 19.

The terminal apparatus 2 may include a control unit 21, a display unit 22, a communication unit 23, and an input detection unit 24. According to an exemplary embodiment, other functions may also be included in the terminal apparatus 2.

The control unit 21 may be a processor, such as a CPU, which may control various operations of the terminal apparatus 2.

According to an exemplary embodiment, the display unit 22 may be, for example, a liquid crystal display, an organic electroluminescence (EL) display, or an inorganic EL display. The display unit 22 may be composed of a touch panel. In this case, the display unit 22 may display various game screens and may also function as an interface that accepts user input provided through a user operation. The display unit 22 may be externally connected to the terminal apparatus 2 and used.

The communication unit 23 may transmit and/or receive information to and/or from the server apparatus 1. The communication unit 23 may perform communication by at least either wired connection or wireless connection.

The input detection unit 24 may be any input device that includes a mechanical push button or a touch sensor. The input detection unit 24 may detect an input operation. An input operation may be any operation; for example, it might be an operation such as pressing, touching, tapping, contacting, approaching, or the like.

An exemplary embodiment of the game system may also be described. In the game system according to this embodiment, the user of the terminal apparatus 2 may be able to log in to the game system and participate in a game or in an event in a game by using game media.

A game may include game activity such as fighting, a quest, a mission, or the like that is provided by the game system. Participating in a game may include, for example, performing fighting, a quest, a mission, or the like, or logging in to the game system in order to perform fighting, a guest, a mission, or the like.

An event in a game may be any event or the like that is held by the game system in a certain period, and may indicate an event in which an activity is performed by a user. This may include, for example, balloting, ranking forecast, contention for precedence, and/or a battle. Participating in an event may indicate performing an activity, such as balloting, ranking forecast, contention for precedence, and/or a battle, or logging in to the game system in order to perform an activity mentioned above.

A game content may be electronic data used in the game. Examples thereof may include a card, an item, a character, an avatar, and a virtual currency used in the game. A game content may include, for example, electronic data that can be obtained, possessed, used, managed, exchanged, combined, enhanced, sold, discarded, and/or donated by a user in the game in accordance with progress of the game; however, the form of using a game content may not be limited to those explicitly described herein. Status information that is unique to a game content may indicate a fighting strength, such as an offensive strength and a defensive strength, of the game content, a fighting device, such as an offensive device and a defensive device, of the game content, the cost of the game content, skill information about the game content, information about an avatar, which is the game content, attributes of the game content described below, an index indicating the degree of rarity of the game content described below, and the like. According to an exemplary embodiment, rarity may be merely one example of a parameter that represents the value of the game content, and therefore, other parameters relating to the value may also be used. Examples of attributes of a game content may include a water attribute, a fire attribute, a thunder attribute, a light attribute, a darkness attribute, and the like. Specifically, according to one exemplary embodiment, AT01 may indicate the water attribute, AT02 may indicate the fire attribute, AT03 may indicate the thunder attribute, AT04 may indicate the light attribute, and AT05 may indicate the darkness attribute. The index indicating the rarity of a game content may be represented by any of a plurality of classes, such as normal (N), rare (R), super rare (SR), hyper rare (HR), and double-super rare (SSR), for example, with the degree of rarity increases in this order from least rare (N) to most rare (SSR). In this embodiment, a description may be given while assuming that a value VA is highest, and the value may decrease in the order of the value VA, a value VB, and a value VC.

According to an exemplary embodiment, the game system may perform a first lottery process in response to a user request or at a predetermined time point. In the lottery process, the identifier output unit 12 of the server apparatus 1 may refer to the game content DB 19*a* that may store therein identifiers and game media that are provided to the user of the terminal apparatus 2 in association with each other. An example of the game content DB 19*a* is illustrated in FIG. 2. In this embodiment, the description is given while assuming that a game content is an item.

Figure 3:
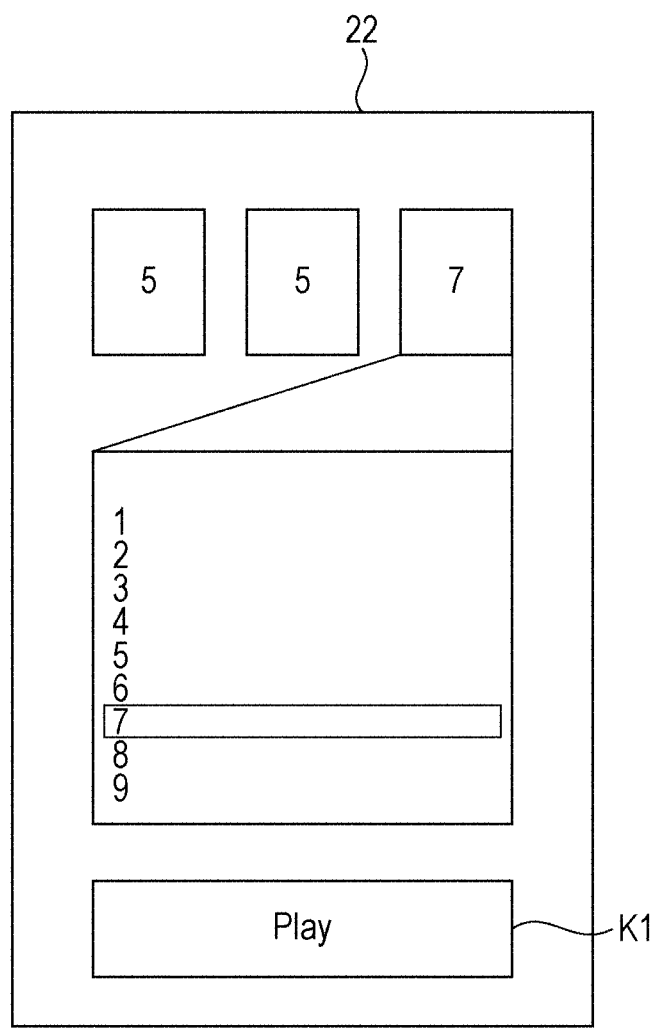
FIG. 3 is a diagram illustrating an example of an image that may be displayed by a display unit of the terminal apparatus illustrated in FIG. 1 when an identifier is to be input.

The identifier output unit 12 may also output identifiers to the terminal apparatus 2 so as to allow the user to input an identifier. The user of the terminal apparatus 2 may input an identifier while viewing an image displayed by the display unit 22. As illustrated in FIG. 3, the user of the terminal apparatus 2 may input "557" as an identifier. At this time, the input detection unit 24 may detect the input of "557". When the user selects a key K1, the control unit 21 may determine that "557" has been selected and may output "557" to the server apparatus 1 via the communication unit 23. According to certain exemplary embodiments, an identifier is a number, such as "557", or may be other than a number. For example, an identifier may be expressed in a language specific to each country, namely, by alphabetic characters, kanji characters, hiragana characters, katakana characters, or the like or may be expressed by symbols. Alternatively, numeric characters, alphabetic characters, kanji characters, hiragana characters, katakana characters, symbols, and the like may be combined, as desired. Note that the number of digits and the number of characters of an identifier may be set as desired.

Still referring to the previous exemplary embodiment, when the identifier obtaining unit 13 of the server apparatus 1 obtains the user's input of "557", the game content output unit 14 may refer to the game content DB 19*a* again, and may search for and obtain a game content corresponding to "557". As illustrated in FIG. 2, a game content corresponding to "557" may be IT777. The identifier obtaining unit 13 may store "557" input and may be selected by the user, for example, in the lottery history DB 19*b* illustrated in FIG. 4.

The game content output unit 14 may output the corresponding game content (IT777) to the terminal apparatus 2. When obtaining the game content, the display unit 22 of the terminal apparatus 2 may update the display so as to indicate the corresponding game content in an area R1 as illustrated in FIG. 5.

Figure 5:
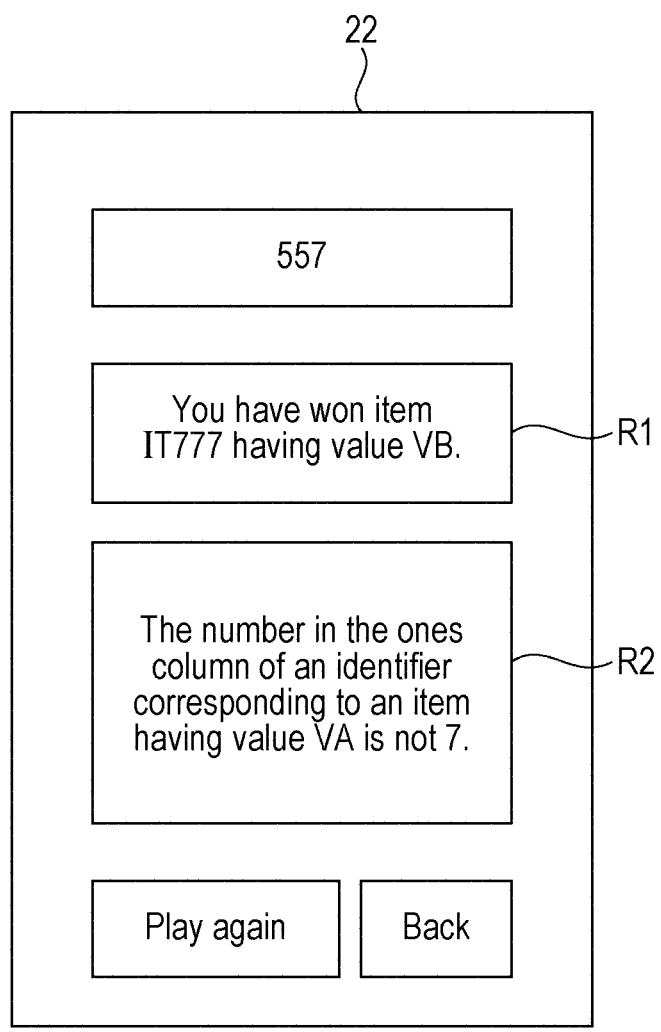
FIG. 5 is a diagram illustrating an example of an image that may be displayed by the display unit of the terminal apparatus illustrated in FIG. 1 after a lottery.

At this time, the hint providing unit 15 may provide a hint, which may be indicated in a region R2 illustrated in FIG. 5. According to this exemplary embodiment, the hint may say "the number in the ones column of an identifier corresponding to an item having the value VA is not 7." A variety of hints or types of hints may be provided, as desired; for example, the hint may be a hint about the sum of the number in the hundreds column of an identifier, the number in the tens column thereof, and the number in the ones column thereof, may be a hint about a product obtained by multiplying the numbers together, or may be a hint about a subtracted value obtained from the numbers. A hint that is provided in this case may say "the sum of the numbers in the respective columns of an identifier corresponding to an item having the value VA is 10", "the product of the numbers in the respective columns of an identifier corresponding to an item having the value VA is 192", or "a value obtained by subtracting the number in the tens column of an identifier corresponding to an item having the value VA from the number in the hundreds column thereof and further subtracting the number in the ones column thereof from the subtraction result −8", for example. The hint may be a hint about a specific column of an identifier (or about a character in a specified column from the beginning in a case where the identifier is not a number). A hint that may be provided in this case may say "the number in the tens column of an identifier corresponding to an item having the value VC is 2", "the number in the ones column of an identifier corresponding to an item having the value VB is 5", "the number in the hundreds column of an identifier corresponding to an item having the attribute AT05 is 3 or 4", or "the character at the beginning of an identifier corresponding to an item having the value VB is T", for example. The hint may be a hint about the range of an identifier. A hint that may be provided in this case may say "an identifier corresponding to an item having the attribute AT02 is between 100 and 150", or "the second character from the beginning of an identifier corresponding to an item having the value VA is an alphabetic character between J and O", for example. Although all of the hints described above are hints relating to the values or attributes of items, the hint may be a hint relating to any status information about a fighting strength and the like of a character. A hint that may be provided in this case may say "the number in the ones column of an identifier corresponding to a character having a fighting strength of 8000 is 5", for example. The hint providing unit 15 may store the provided hint in the provided-hint DB 19c illustrated in FIG. 6.

The user of the terminal apparatus 2 can select a subject (item, value, attribute, or the like, for example) for which the user wants a hint. According to an exemplary embodiment, when the user selects a subject for which the user wants a hint, and notifies the server apparatus 1 of the selection by using the terminal apparatus 2, the hint providing unit 15 may generate and provide hints relating to the selected subject. According to an exemplary embodiment, the selected subject may be changeable at any time point or may be changeable when the hints relating to the selected subject have been provided by the hint providing unit 15.

In some cases, associations between identifiers and game media may be common to users, for example users that are associated with each other as a result of a friend request or in a raid. In such cases, hints may be sharable between the terminal apparatuses of the users, as desired. That is, a user can request the hint providing unit 15 to provide the user with a hint that has been provided to another user associated with the user.

According to an exemplary embodiment, the hint providing unit 15 may provide a hint only in a case where a game content output to the terminal apparatus 2 by the game content output unit 14 is a specific game content. For example, a specific game content might be a game content other than a special game content having a value higher than a predetermined value or having an attribute desired by the user.

After the end of the first lottery process described above, the game system may perform a second lottery process in response to a user request or at a predetermined time point.

According to an exemplary embodiment where a second lottery process is performed, in the second lottery process, the identifier output unit 12 may refer to the game content DB 19a. The identifier output unit 12 may further refer to the lottery history DB 19b and may identify identifiers that have not been selected in lotteries. After referring to the DBs, the identifier output unit 12 may output identifiers that have not been obtained by the identifier obtaining unit 13 so as to allow the user to input an identifier that has not been selected in a lottery. This may, for example, prevent the user from inputting "557".

Figure 7:
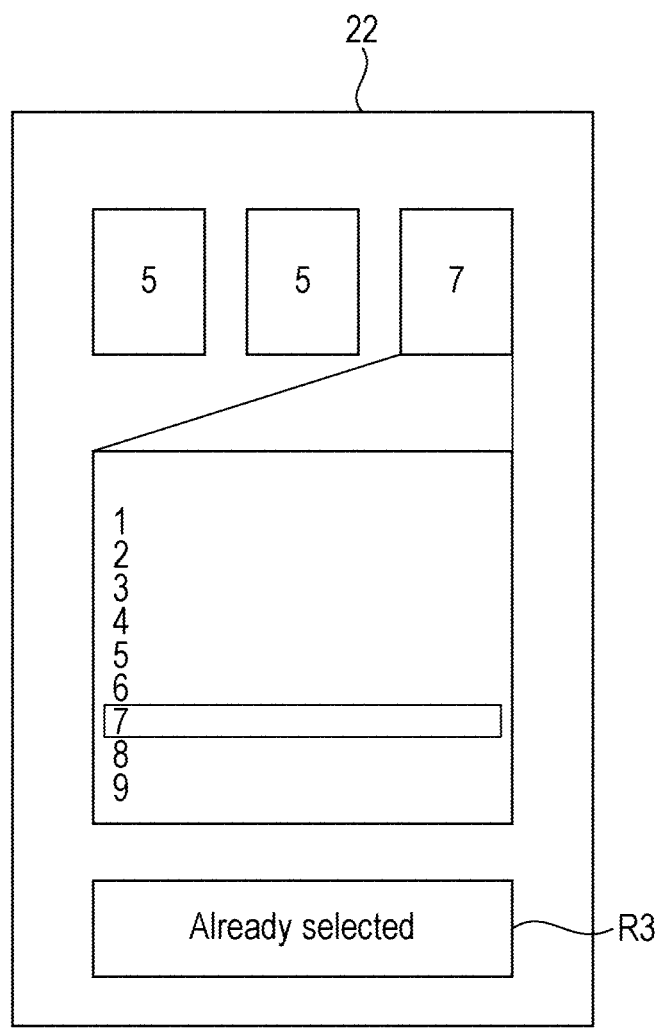
FIG. 7 is a diagram illustrating an example image that may be displayed by the display unit of the terminal apparatus illustrated in FIG. 1 when an identifier is not allowed to be input.

When an identifier is obtained, the display unit 22 may display an image as illustrated in FIG. 7. In a case where the user inputs "557" after "557" has already been selected, the display unit 22 may display a message "Already selected" as indicated in an area R3 to thereby notify the user that, this time, the user is not allowed to input "557", which has been selected.

Figure 8:
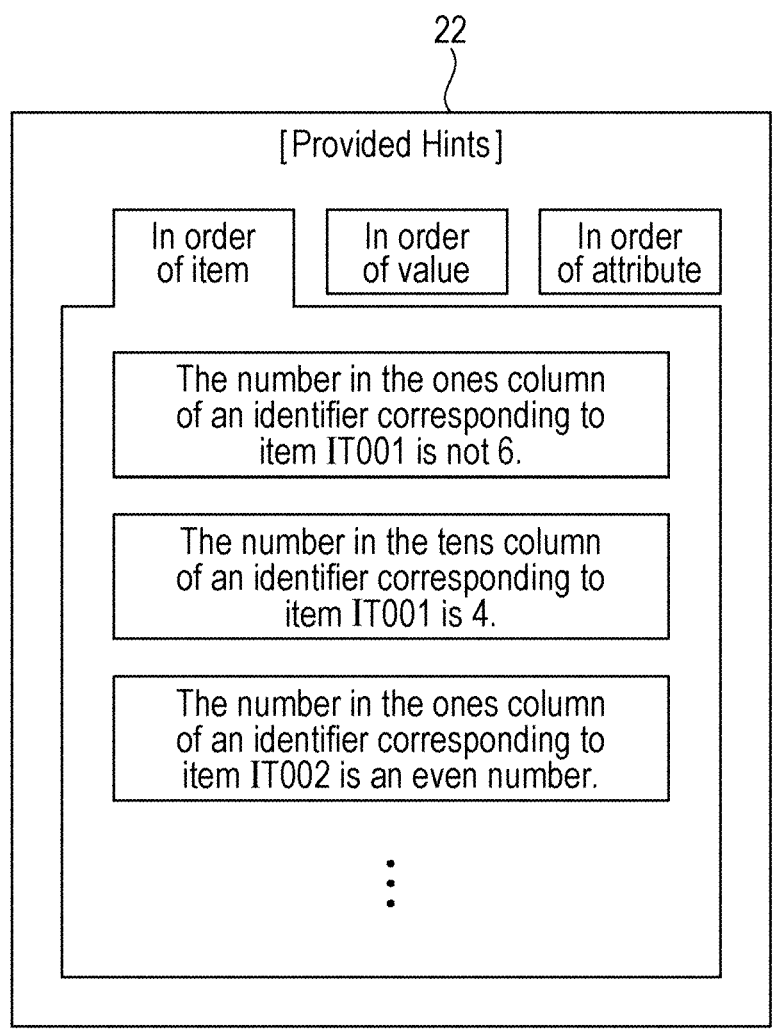
FIG. 8 is a diagram illustrating an example of an image that may be displayed when the display unit of the terminal apparatus illustrated in FIG. 1 displays hints that have been provided.

According to an exemplary embodiment, at this time, the hint providing unit 15 may provide a list of provided hints to the terminal apparatus 2 in response to a user request or at a predetermined time point. That is, the display unit 22 may display hints that have been previously provided, as illustrated in FIG. 8. The displayed hints can be classified according to specific subjects on the basis of any criterion. Alternatively, the hint providing unit 15 may provide a hint generated in advance each time a lottery process is performed, and may provide a list of all hints when all the hints have been provided.

The display information output unit 17 can output information about the number of identifiers that are associated with a specific game content among selectable identifiers or about the ratio of identifiers that are associated with a specific game content relative to selectable identifiers. For example, the display information output unit 17 may generate display information indicating the number of identifiers corresponding to game media having a value equal to or larger than a predetermined value and may output the display information to the terminal apparatus 2.

As a different function, the identifier output unit 12 may select a certain identifier on the basis of at least either of the hints that have been provided and the game media that have been output, and may output, to the terminal apparatus 2, an image of an input screen on which the identifier is input to the input field. According to an exemplary embodiment, the server apparatus 1 may perform a process described below.

First, the identifier output unit 12 may refer to the lottery history DB 19b and the provided-hint DB 19c and may obtain the lottery history and provided hints. The identifier output unit 12 may generate an identifier and, if the identifier is an identifier that is stored in the lottery history DB 19*b* and that has been selected, may generate another identifier. When an identifier that is not stored in the lottery history DB 19*b* is generated, the identifier output unit 12 may determine whether the identifier is consistent with the provided hints and, if the identifier is not consistent with the provided hints, may generate another identifier. If the identifier is consistent with the provided hints, the identifier output unit 12 may output the identifier to the terminal apparatus 2.

For example, it is assumed that the lottery history DB 19*b* may store therein an identifier "123" and that the hint providing unit 15 has provided a hint saying "the number in the ones column of an identifier corresponding to a game content having the value VA is not 7." In this case, the identifier output unit 12 may output an identifier that has a number other than 7 in the ones column and that is not "123".

According to an exemplary embodiment, when obtaining the output identifier, the display unit 22 of the terminal apparatus 2 may perform display for requesting the user to select any of playing a lottery, obtaining another identifier, or cancelling, any of which the user may select. In a case where the user selects playing a lottery, the control unit 21 may detect the selection and may output the selection to the server apparatus 1, and the server apparatus 1 may perform a lottery process. In a case where the user selects obtaining another identifier, the server apparatus 1 may output, to the terminal apparatus 2, an image of an input screen on which another identifier is input to the input field. In a case where the user selects cancelling, the server apparatus 1 may not perform a lottery process, and the display unit 22 may display the previous screen, the top screen of the game, or the like.

After the user has selected an identifier, the control unit 21 may output the identifier to the server apparatus 1. Accordingly, the hint providing unit 15 can determine which identifier the user has input for the hint and can infer which game content the user wants. For example, in a state where a hint stating that "the number in the ones column of an identifier corresponding to a game content having the value VA is not 7" has been provided, when a user inputs an identifier having a number other than 7 in the ones column, the hint providing unit 15 may determine that the user wants a game content having the value VA. The hint providing unit 15 may generate a hint to be provided in the next lottery process by using the result of determination. In this case, the hint providing unit 15 may provide a hint about an identifier that is associated with a game content having the value VA, for example.

When the server apparatus 1 obtains an identifier, the server apparatus 1 may search for and obtain a game content corresponding to the identifier and may output the game content to the terminal apparatus 2. At this time, the hint providing unit 15 may further provide a hint.

The user can output a reset request to the server apparatus 1 at any time point by using the terminal apparatus 2. When receiving the reset request, the reset unit 16 may reset associations between identifiers and game media and may modify the associations. At this time, the reset unit 16 may update revisions of the lottery history and the hint history or may delete the histories.

After resetting, the hint providing unit 15 may provide the same number of hints as the hints provided before resetting to the terminal apparatus 2.

According to the exemplary embodiment described above, a user may input one identifier in one lottery process. However, a user may be allowed to input a plurality of identifiers in one lottery process. In this case, the hint providing unit 15 may provide one hint each time one game content is output.

In the embodiment described above, the game content output unit 14 may output a game content and the hint providing unit 15 may provide a hint in a lottery process. However, the hint providing unit 15 may provide a hint when the user of the terminal apparatus 2 interacts with another user. For example, a hint may be provided when the user of the terminal apparatus 2 makes a friend request or a request for returning from an inactive state, entices another user to participate in the game, or gives a game content. A user returning from an inactive state may indicate a user logging in to the game system after a certain period over which the user has not logged in to the game system.

The hint providing unit 15 may change the number of hints in accordance with a difference in status information in the game system between users interacting with each other. Specifically, the hint providing unit 15 may increase the number of hints to be provided as a difference in the level, deck strength, play time, and/or progress of a quest, for example, between the users becomes larger.

The hint providing unit 15 may provide a hint when the user of the terminal apparatus 2 clears a predetermined game or a predetermined event in a game. The hint providing unit 15 may provide a hint in accordance with the state of participation of the user of the terminal apparatus 2 in a game or in an event in a game. For example, the hint providing unit 15 may provide a hint when a user logs in to the game system for the first time, when the login rate exceeds a predetermined value, when the login rate is improved, and the like.

In the embodiment described above, the identifier output unit 12 may output identifiers that have not been obtained by the identifier obtaining unit 13 so as to allow the user to only input an identifier that has not been selected in a lottery. However, according to an exemplary embodiment, the identifier output unit 12 may also output identifiers that have been obtained by the identifier obtaining unit 13 so as to allow the user to input an identifier that has been selected in a lottery.

In the embodiment described above, the case has been described where the server apparatus 1 performs two lottery processes. According to another exemplary embodiment, the server apparatus 1 may perform any number of lottery processes, and the process described as the second lottery process may be performed in a third or subsequent lottery process.

In the embodiment described above, the identifier output unit 12 of the server apparatus 1 may output identifiers to the terminal apparatus 2, and the identifier obtaining unit 13 may obtain an identifier selected through a user operation from among the output identifiers. According to another exemplary embodiment, the server apparatus 1 may not include the identifier output unit 12. That is, the identifier obtaining unit 13 may obtain an identifier that is selected by a user regardless of identifiers output by the identifier output unit 12.

In the embodiment described above, when a user selects one identifier, the identifier obtaining unit 13 may obtain the selected one identifier, and the game content output unit 14 may output one game content that is associated with the identifier. However, according to another exemplary embodiment, the identifier obtaining unit 13 may receive an output request for outputting a certain number of game media together with a selected identifier, the request being made in accordance with the user's choice. According to this embodiment, the game content output unit 14 may output game media that are associated with the certain number of identifiers including the selected identifier and an additional (bonus) game content. More specifcally, in a case where a user pays to play a lottery ten times (in a currency used in the game, for example) and selects "557", the game content output unit 14 may output ten game media respectively associated with the identifiers "557" to "566" and an additional game content associated with the identifier "567".

Figure 9:
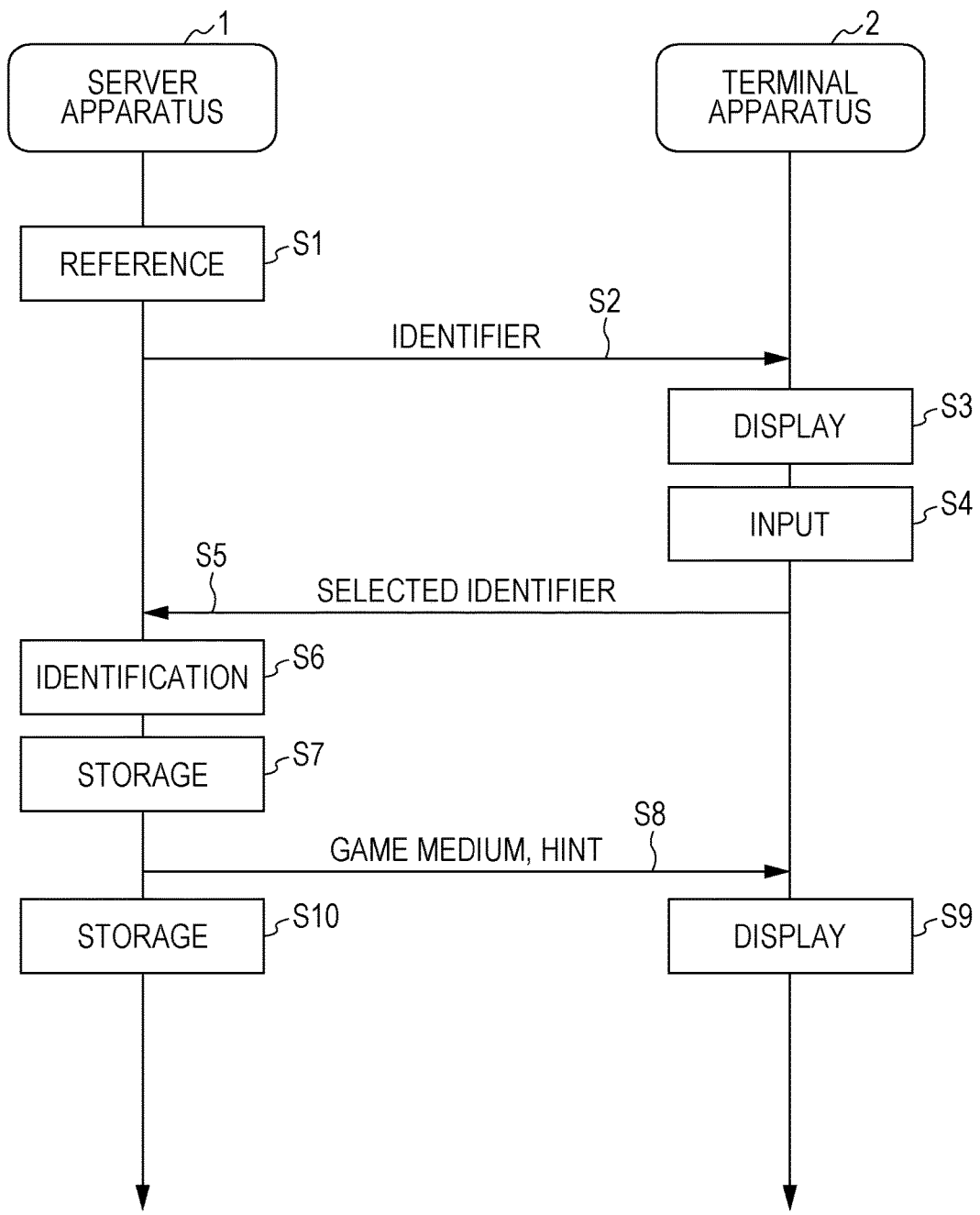
FIG. 9 is a diagram illustrating an example of an operation flow of the server apparatus and the terminal apparatus illustrated in FIG. 1.

Exemplary FIG. 9 is a diagram illustrating an operation flow of the game system illustrated in FIG. 1.

In the first lottery process, the server apparatus 1 may refer to the game content DB 19a (step S1) and may obtain any identifiers (step S2). The terminal apparatus 2 that obtains the identifiers may display the identifiers (step S3). The terminal apparatus 2 may accept, input of an identifier from the user (step S4) and, when detecting selection of the identifier, may output the selected identifier to the server apparatus 1 (step S5).

The server apparatus 1 may refer to the game content DB 19a, and may search for and obtain a game content corresponding to the obtained identifier (step S6). Further, the server apparatus 1 may store the obtained identifier in the lottery history DB 19b (step S7).

Next, the server apparatus 1 may output and provide the corresponding game content and a hint to the terminal apparatus 2 (step S8). The terminal apparatus 2 may display the obtained game content and hint (step S9). The server apparatus 1 may store the provided hint in the provided-hint DB 19c (step S10).

Figure 10:
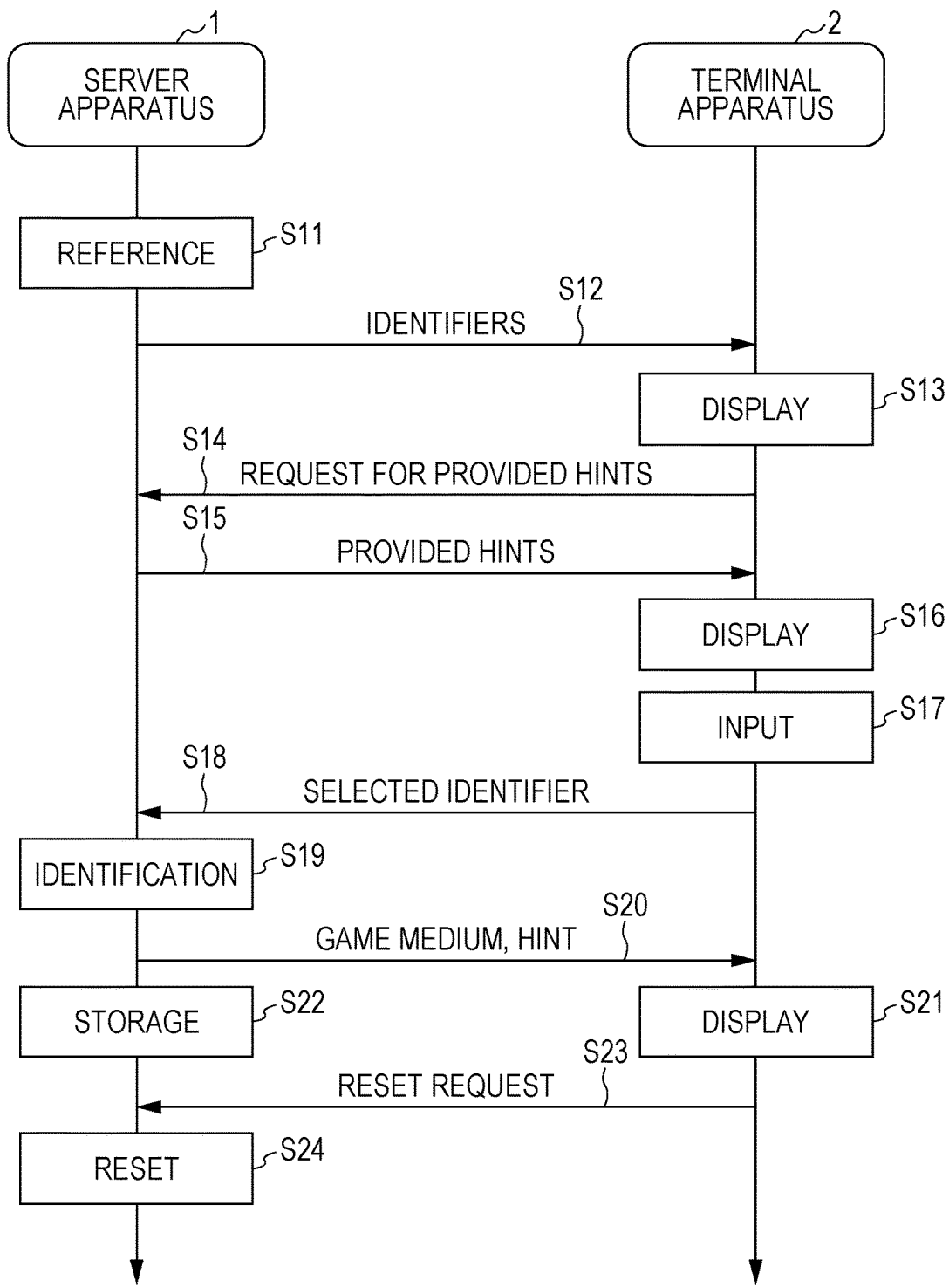
FIG. 10 is a diagram illustrating an alternative example of an operation flow of the server apparatus and the terminal apparatus illustrated in FIG. 1.

In the second lottery process illustrated in FIG. 10, the server apparatus 1 may refer to the game content DB 19a and the lottery history DB 19b (step S11) and may output, to the terminal apparatus 2, identifiers that have not been obtained in step S5 so as to allow the user to only input an identifier that has not been selected in a lottery (step S12). At this time, the server apparatus 1 may output an identifier that has not been obtained from the terminal apparatus 2, the identifier being input to an input field.

The terminal apparatus 2 may display an obtained identifier (step S13). The terminal apparatus 2 can request the server apparatus 1 to provide again any previously provided hints in response to a user request (step S14). At this time, the terminal apparatus 2 may request a list of hints or may request hints classified according to specific subjects. When receiving the request, the server apparatus 1 may provide provided hints in accordance with the request (step S15). When obtaining the hints, the terminal apparatus 2 may display the hints (step S16). The terminal apparatus 2 may accept input of an identifier from the user (step S17) and, when detecting selection of the identifier, may output the selected identifier to the server apparatus 1 (step S18).

The server apparatus 1 may refer to the game content DB 19a, and may search for and obtain a game content corresponding to the obtained identifier (step S19). The server apparatus 1 may output and provide the corresponding game content and a hint to the terminal apparatus 2 (step S20). The terminal apparatus 2 may display the obtained game content and hint (step S21). The server apparatus 1 may store the provided hint in the provided-hint DB 19c (step S22).

According to an exemplary embodiment, the terminal apparatus 2 can output a reset request at any time point thereafter (step S23). When receiving the reset request, the server apparatus 1 may reset associations between identifiers and game media (step S24).

According to an exemplary embodiment, the storage unit 19 may store identifiers and game media in association with each other, and the identifier obtaining unit 13 may obtain an identifier selected through a user operation from the terminal apparatus 2. The game content output unit 14 may obtain a game content, that is associated with the identifier, which may be obtained by the identifier obtaining unit 13; the game content output unit 14 may then output the game content to the terminal apparatus 2. According to an exemplary embodiment, a game content may not be identifiable using an identifier. Further, according to an exemplary embodiment, a user may be able to select an identifier on their own, and may therefore be able to control the result of the lottery more actively than existing lotteries. Accordingly, it is possible to increase the degree of trust in the system while maintaining the joy of winning in a lottery as a result of a random selection.

According to an exemplary embodiment, the hint providing unit 15 may provide a hint about an association between an identifier and a game content. Accordingly, the user can understand that the result of a lottery is fixed and is not manipulated and can use their experience and knowledge in further attempts to play the lottery. Further, it is possible to increase the degree of trust in the system.

According to an exemplary embodiment, the hint providing unit 15 may provide a hint when the user of the terminal apparatus 2 clears a predetermined game or a predetermined event in a game. Accordingly, it is possible to increase the motivation for clearing a game or an event in a game.

According to an exemplary embodiment, the hint providing unit 15 may provide a hint when the user of the terminal apparatus 2 interacts with another user. Accordingly, it is possible to increase the level of interest in the system.

According to an exemplary embodiment, the hint providing unit 15 may provide a hint in accordance with the state of participation of the user of the terminal apparatus 2 in a game or in an event in a game. Accordingly, it is possible to increase the motivation for participating in a game or in an event in a game.

According to an exemplary embodiment, the hint providing unit 15 may provide a list of provided hints, and a user may view the list and participate in the next lottery. Accordingly, the user's probability of successfully acquiring a desired game content may increase based on their knowledge of these hints.

According to an exemplary embodiment, the hints in the list can be classified according to specific subjects that include at least one of item, value, and attribute. Accordingly, the user may be able to easily find hints relating to a desired subject even if the number of hints becomes larger.

According to an exemplary embodiment, a hint can be shared between users that are associated with each other. Accordingly, users may socialize with one another more actively, and the probability of a user successfully acquiring a desired game content increases.

According to an exemplary embodiment, the hint providing unit 15 may provide a hint only in a case where a game content output by the game content output unit 14 is a specific game content. Therefore, control can be performed so as to provide a hint only in a case where a game content that has been output is a game content that is not desired by the user, for example. Accordingly, it is possible to increase the motivation of the user that has acquired an undesired game content to participate in the lottery again.

According to an exemplary embodiment, the hint providing unit 15 may provide hints relating to a subject selected by the user. Accordingly, the user can only obtain hints relating to a desired game content. As a result, the probability of the user successfully acquiring the desired game content may increase.

According to an exemplary embodiment, the identifier output unit 12 may select a certain identifier on the basis of at least either of the hints that have been provided and the game media that have been output, and outputs the identifier, which is input to the input field. That is, it may be possible to output an identifier while taking into account the content of the provided hints and/or refraining from outputting identifiers that are associated with the output game media. Accordingly, the probability of a user successfully acquiring a desired game content may increase.

According to an exemplary embodiment, the identifier output unit 12 may output identifiers that have not been obtained by the identifier obtaining unit 13. Accordingly, it may be possible to prevent a user from mistakenly inputting an identifier that has been previously input and selected by the user.

According to an exemplary embodiment, the server apparatus 1 may further include a reset unit 16 that resets associations between identifiers and game media. Accordingly, a user that has acquired a desired game content may be able to reset the present associations and try acquiring a desired game content on the basis of the new associations.

According to an exemplary embodiment, an identifier may be expressed by any of numeric characters, kanji characters, alphabetic characters, hiragana characters, katakana characters, and symbols, or a combination thereof. Accordingly, it is possible to create various identifiers.

Further, according to an exemplary embodiment, the hint providing unit 15 may provide, after resetting by the reset unit 16, the same number of hints as the hints provided before resetting. Accordingly, it may be possible to maintain the probability of successfully acquiring a desired game content even after resetting.

Further, according to an exemplary embodiment, in a case where the identifier obtaining unit 13 receives an output request for outputting a certain number of game media together with an identifier selected through a user operation, the game content output unit 14 may output game media that are associated with the certain number of identifiers including the selected identifier and an additional game content. That is, the user may be able to additionally acquire game media compared to a normal lottery. Accordingly, the motivation for participating in the lottery may increase.

According to an exemplary embodiment, in the case where the server apparatus 1 is connected to the terminal apparatus 2 over a network, a screen relating to progress in the lottery process may be implemented as a Web display screen that may be displayed by the terminal apparatus 2 on the basis of data generated by the server apparatus 1. In this case, other screens, such as a menu screen, may be displayed by a native application installed on the terminal apparatus 2, that is, by way of native display, for example, to thereby implement the game of the present invention as a hybrid game for which the server apparatus 1 and the terminal apparatus 2 perform respective portions of the process.

According to an exemplary embodiment, in a case where at least one of the control unit 11 of the server apparatus 1 and the control unit 21 of the terminal apparatus 2 according to the present invention is implemented as a computer, a program that describes processes for implementing the functions may be stored an internal or external storage unit of the computer, and a CPU of the computer may read and execute the program to thereby implement the functions. Such a program can be distributed by, for example, selling, transferring, or lending a portable recording content, such as a digital versatile disc (DVD) or a compact disc read-only memory (CD-ROM). Alternatively, such a program can be distributed by storing the program in a storage unit of a server on a network and transferring the program from the server to another computer over the network, for example. A computer that executes the program can store the program recorded to the portable recording content or the program transferred from the server in a storage unit of the computer, for example. As another embodiment of the program, the computer may read the program directly from the portable recording content and perform a process in accordance with the program. Alternatively, the computer may, each time the program is transferred from the server to the computer, perform a process in accordance with the received program.

Although the present invention has been described with reference to the drawings and embodiments, it should be noted that those skilled in the art can easily make various modifications and alterations on the basis of the present disclosure and that these modifications and alterations fail within the scope of the present invention. For example, functions and the like included in the functional units, steps, or the like can be rearranged without causing any logical inconsistency, and a plurality of functional units, steps, or the like can be combined into one unit or step, or can be divided.

What is claimed is:

1. A server apparatus for providing to a user of a terminal apparatus, over a network, a game that uses game content, the game content being associated with a plurality of identifiers and the terminal apparatus configured to display the plurality of identifiers in a manner that obfuscates the game content, the server apparatus comprising:

a storage unit, the storage unit configured to store the plurality of identifiers and game content in association with each other and a lottery history database;

an identifier obtaining unit, the identifier obtaining unit configured to obtain, from the terminal apparatus, an identifier not stored in the lottery history database and selected through a user operation of the user of the terminal apparatus, the identifier obtaining unit further being configured to store the obtained identifier in the lottery history database;

a game content output unit, the game content output unit configured to obtain a game content associated with the identifier obtained by the identifier obtaining unit and configured to output the game content to the terminal apparatus;

a reset unit, the reset unit configured to reset associations between the plurality of identifiers and the game content by performing a resetting step comprising resetting a game content database comprising associations between identifier content and game content, and further comprising deleting contents of the lottery history database, the reset unit further being configured to perform resetting in response to a user request from the user of the terminal apparatus or in a case when a predetermined condition is satisfied.

2. The server apparatus according to claim 1, further comprising a hint providing unit, the hint providing unit configured to provide one or more hints about an association between an identifier and the game content, wherein the identifier obfuscates the game content associated with the identifier from the user such that the user is unable to identify the game content by using the identifier;

wherein the one or more hints that are provided to the user are displayed on the terminal apparatus of the user; and wherein the hint providing unit relates a hint to the identifier based on an input provided by the user.

3. The server apparatus according to claim 2, wherein the hint providing unit is configured to provide the one or more hints in a case where the user of the terminal apparatus interacts with another user.

4. The server apparatus according to claim 2, wherein the hint providing unit is configured to provide the one or more hints in accordance with a state of participation of the user of the terminal apparatus in a game or in an event in a game.

5. The server apparatus according to claim 2, wherein the hint providing unit is configured to provide a plurality of hints, the plurality of hints including hints that have been previously provided.

6. The server apparatus according to claim 5, wherein the hint providing unit is configured to provide a list of the hints that have been previously provided.

7. The server apparatus according to claim 5, wherein the hints are classifiable according to specific subjects, and wherein the specific subjects include at least one of item, value, and attribute.

8. The server apparatus according to claim 2, wherein the hint provided by the hint providing unit is sharable between the user of the terminal apparatus and a user associated with the user of the terminal apparatus.

9. The server apparatus according to claim 2, wherein the hint providing unit is configured to provide the one or more hints only in a case where the game content output by the game content output unit is a specific game content.

10. The server apparatus according to claim 2, wherein the one or more hints that are provided to the user are customized based on a level of status information of the user or a level of activity of the user.

11. The server apparatus according to claim 2, wherein the user of the terminal apparatus is prompted to select a subject corresponding to a particular game content, and wherein the hint providing unit provides a hint relating to a subject selected by the user of the terminal apparatus.

12. The server apparatus according to claim 11, wherein the hint providing unit determines whether a game content output by the game content output unit is the subject selected by the user of the terminal apparatus, and wherein the hint providing unit is configured to provide the one or more hints when it is determined that the game content output by the game content output unit is not the subject selected by the user of the terminal apparatus.

13. The server apparatus according to claim 1, further comprising:
an identifier output unit configured to obtain identifiers from the storage unit and configured to output the identifiers to the terminal apparatus, wherein the identifier obtaining unit is configured to obtain an identifier selected through a user operation from among the identifiers that have been output.

14. The server apparatus according to claim 13, wherein the identifier output unit is configured to select a certain identifier on the basis of at least one of: a hint that has been provided and a game content that has been output, and wherein the identifier output unit outputs the identifier, and wherein the identifier is input to an input field.

15. The server apparatus according to claim 13, wherein the identifier output unit is configured to output identifiers that have not been obtained by the identifier obtaining unit.

16. The server apparatus according to claim 1, wherein the identifier obtaining unit is configured to receive an output request for outputting a number of game content together with the identifier selected through a user operation, and wherein the game content output unit is configured to output game content that are associated with the certain number of identifiers including the selected identifier and an additional game content.

17. The server apparatus according to claim 1, wherein the identifier selected through the user operation of the user of the terminal apparatus is expressed by at least one of: a numeric character, a kanji character, an alphabetic character, a hiragana character, a katakana character, and a symbol, or a combination thereof.

18. The server apparatus according to claim 2, wherein the hint providing unit is configured to provide a plurality of hints, wherein the user of the terminal apparatus selects a first identifier, a first hint is provided to the user of the terminal apparatus, the user of the terminal apparatus selects a second identifier, and a second hint is provided to the user of the terminal apparatus;
wherein the first hint is a limited set of identifiers in the plurality of identifiers, an identifier in the limited set of identifiers being associated with an inferredly-desirable game content;
wherein the hint providing unit determines if the second identifier is within the limited set of identifiers, and, when the second identifier is within the limited set of identifiers, provides the second hint associated with the inferredly-desirable game content.

19. A control method for a server apparatus for providing to a user of a terminal apparatus, over a network a game that uses game content, the game content being associated with a plurality of identifiers and the terminal apparatus configured to display the plurality of identifiers in a manner that obfuscates the game content, he control method comprising:
storing, in a storage unit, the plurality of identifiers and game content in association with each other and a lottery history database;
obtaining, using an identifier obtaining unit, from the terminal apparatus, an identifier not stored in the lottery history database and selected through a user operation of the user of the terminal apparatus, the identifier obtaining unit further being configured to store the obtained identifier in the lottery history database;
determining, using a game content output unit, a game content associated with said identifier;
outputting, to the terminal apparatus, the game content associated with said identifier;
resetting, by a reset unit, associations between the plurality of identifiers and the game content, the resetting step comprising resetting a game content database comprising associations between identifier content and game content, and further comprising deleting contents of the lottery history database, wherein the step of resetting is performed in response to a user request from the user of the terminal apparatus or in response to the satisfaction of a predetermined condition.

20. A computer program product embodied on a non-transitory computer readable medium and containing instructions that, when executed for causing cause a computer that provides to a user of a terminal apparatus, over a network, a game using game content, the game content being associated with a plurality of identifiers and the terminal apparatus configured to display the plurality of identifiers in a manner that obfuscates the game content, to perform:
storing, in a storage unit, a plurality of identifiers and game content in association with each other and a lottery history database;

obtaining, using an identifier obtaining unit, from the terminal apparatus, an identifier not stored in the lottery history database and selected through a user operation of the user of the terminal apparatus, the identifier obtaining unit further being configured to store the obtained identifier in the lottery history database;

determining, using a game content output unit, a game content associated with said identifier;

outputting, to the terminal apparatus, the game content associated with said identifier; and content resetting, by a reset unit, associations between the plurality of identifiers and the game content, the resetting step comprising resetting a game content database comprising associations between identifier content and game content, and further comprising deleting contents of the lottery history database, wherein the step of resetting is performed in response to a user request from the user of the terminal apparatus or in response to the satisfaction of a predetermined condition.

* * * * *